(12) United States Patent
Brown et al.

(10) Patent No.: US 9,409,273 B2
(45) Date of Patent: Aug. 9, 2016

(54) COMBINATION OF ELECTRIC TOOLS AND START METHOD THEREOF

(71) Applicant: Positec Power Tools (Suzhou) Co., Ltd., Suzhou (CN)

(72) Inventors: Warren Brown, Mount Evelyn (AU); Harry Szommer, Berwick (AU); Graham Gerhardt, Warrandyte (AU)

(73) Assignee: POSITEC POWER TOOLS (SUZHOU) CO. (CN)

( * ) Notice: Subject to any disclaimer, the term of this patent is extended or adjusted under 35 U.S.C. 154(b) by 833 days.

(21) Appl. No.: 13/718,829

(22) Filed: Dec. 18, 2012

(65) Prior Publication Data

US 2014/0008087 A1  Jan. 9, 2014

Related U.S. Application Data

(63) Continuation-in-part of application No. PCT/CN2011/075952, filed on Jun. 20, 2011.

(30) Foreign Application Priority Data

Jun. 18, 2010 (CN) .......................... 2010 1 0213975

(51) Int. Cl.
*B23Q 41/00* (2006.01)
*A47L 9/28* (2006.01)
*B25F 3/00* (2006.01)
*B25F 5/00* (2006.01)
*E04F 21/00* (2006.01)

(52) U.S. Cl.
CPC ............... *B23Q 41/00* (2013.01); *A47L 9/2805* (2013.01); *B25F 3/00* (2013.01); *B25F 5/00* (2013.01); *E04F 21/00* (2013.01)

(58) Field of Classification Search
CPC ....... A47L 5/38; A47L 9/2805; A47L 9/2889; B25D 59/006; Y02P 70/171; B23Q 11/0046; Y10T 83/207
See application file for complete search history.

(56) References Cited

U.S. PATENT DOCUMENTS

| | | | | |
|---|---|---|---|---|
| 4,991,253 A * | 2/1991 | Rechsteiner | .......... | A47L 9/2821 15/301 |
| 5,136,750 A * | 8/1992 | Takashima | ............ | A47L 9/2857 15/319 |
| 5,323,483 A * | 6/1994 | Baeg | ...................... | A47L 9/2815 15/319 |
| 5,747,973 A * | 5/1998 | Robitaille | ................. | G05F 1/45 307/39 |
| 5,955,791 A * | 9/1999 | Irlander | ............... | H01H 47/001 307/116 |
| 6,012,199 A * | 1/2000 | Litomisky | ................. | A47L 5/38 15/301 |
| 6,044,519 A * | 4/2000 | Hendrix | ................ | A47L 9/2805 15/319 |
| 7,146,677 B2 * | 12/2006 | Litomisky | ................. | A47L 5/38 15/301 |

(Continued)

FOREIGN PATENT DOCUMENTS

| | | |
|---|---|---|
| CN | 1261570 | 8/2000 |
| CN | 1486797 | 4/2004 |

(Continued)

*Primary Examiner* — Andrew M Tecco
(74) *Attorney, Agent, or Firm* — Kirton McConkie; Evan R. Witt

(57) ABSTRACT

A combination of electric tools includes a first electric tool and a second electric tool respectively having an independent power supply. The second electric tool starts working automatically responding to the startup of the first electric tool. Thereby the second electric tool starts automatically after the first electric tool is started to operate by a user without an extra operation of the user, which is convenient to the user.

14 Claims, 7 Drawing Sheets

(56) References Cited

U.S. PATENT DOCUMENTS

| | | | |
|---|---|---|---|
| 2004/0093682 A1* | 5/2004 | Litomisky | A47L 5/38 15/314 |
| 2009/0241283 A1* | 10/2009 | Loveless | A47L 7/0085 15/319 |

FOREIGN PATENT DOCUMENTS

| | | |
|---|---|---|
| CN | 200991882 | 12/2007 |
| JP | 9-271621 | 10/1997 |
| JP | 2002-326119 | 11/2002 |
| WO | 2010137446 | 12/2010 |

* cited by examiner

COMBINATION OF ELECTRIC TOOLS AND START METHOD THEREOF

CROSS REFERENCE TO RELATED APPLICATION

This is a continuation-in-part of International Application No. PCT/CN2011/075952, with an international filing date of Jun. 20, 2011, which International Application claims foreign priority to Chinese Patent Application No. 201010213975.4, filed on Jun. 18, 2010 in the SIPO (State Intellectual Property of the P.R.C). The foregoing applications are incorporated by reference.

TECHNICAL FIELD

The present invention relates to a combination of electric tools, and a method for starting the combination of electric tools.

BACKGROUND OF THE INVENTION

During daily work, the user usually uses more than two electric tools to process workpieces. For example, when cutting the workpieces, the cutting machine is used, but to avoid polluting the environment and injury from dust generated by cutting, usually a vacuum cleaner is also used in combination with the cutting machine; or when the user needs to polish the workpieces in a dim environment, a working lamp and an electric tool such as a sander are required to be used at the same time; or when processing workpieces using an electric router, to avoid blocking the sight, a blower is also adopted to blow off the chips.

In the prior art, when using more than two electric tools, the user usually needs to control the electric tools one by one, for example, when performing cutting in a dim environment, the user turns on the working lamp first, then starts the vacuum cleaner, and next powers on the cutting machine to cut pieces; when cutting is completed, the user powers off the electric tool, stops the vacuum cleaner, and turns off the working lamp. This makes the cutting work very complicated.

SUMMARY OF THE INVENTION

In the above account, it is necessary to provide a combination of electric tools conveniently controlled by the user and a startup method thereof.

In a preferred embodiment, a combination of electric tools includes a first electric tool and a second electric tool respectively having an independent power supply. The second electric tool starts working automatically responding to the startup of the first electric tool.

Preferably, the independent power supply is a battery pack.

Preferably, the second electric tool is a vacuum cleaner, and the vacuum cleaner also includes: a battery pack as the power supply of the second electric tool; a body for vacuuming; a hose installed on the body, the hose includes a tool connection end which is connected with the first electric tool.

Preferably, the control module is arranged at a position in the hose close to the end connection end.

Preferably, the control module is sealed in the lateral side of the hose.

The present invention provides a vacuum cleaner for being used in combination with the electric tool. The vacuum cleaner includes: a body capable of vacuuming, a hose installed on the body, and a switch controlling the work of the body. The vacuum cleaner includes a control module which controls the switch to be energized or not by detecting the vibration generated after startup of the electric tool.

Preferably, the control module is a sound control module which senses the sound signal generated by the vibration to control the switch to be energized or not.

Preferably, the sound control module includes a sound sensor which converts the sensed sound into the sensing signal and outputting the sensing signal, and a signal amplification circuit which is connected with the sound sensor and the switch, amplifying and outputting the sensing signal to the switch, and turning on the switch.

Preferably, the sound control module also includes a comparator which is electrically connected between the signal amplification circuit and the circuit; the comparator compares the voltage of the sensing signal with a preset reference voltage; and when the voltage of the sensing signal is greater than the reference voltage, the sound control module controls the switch to be energized.

Preferably, the sound control module also includes a delay circuit capable of counting time; when the sensing signal output by the sound sensor lasts a preset time length, the sound control module controls the switch to be energized.

Preferably, the sound sensor is located on one side of the top of the body where the hose is installed.

Preferably, the sound control module includes: the sound sensor, converting the sensed sound signal into the analogue signal; the signal amplification circuit, electrically connected with the sound sensor, and amplifying the sensing signal by a fixed factor; an analog-digital conversion circuit, electrically connected with the signal amplification circuit, receiving the sensing signal and converting the analogue signal into the digital signal; a memorizer, storing a preset condition; and a processor, electrically connected with the analog-digital conversion circuit and the memorizer, receiving the digital signal, reading the preset condition, and when the digital signal meets the preset condition, controlling the switch to be energized.

Preferably, the preset condition is at least one feature value of the sound signal, and the feature value is a frequency, amplitude, period, peak value, valley value, or optional combinations thereof.

Preferably, the sound control module also includes a filter circuit which is electrically connected between the sound sensor and the analog-digital conversion circuit.

Preferably, the vacuum cleaner is operable to store the frequency, amplitude, period, peak value, valley value, or optional combinations thereof of the currently sensed sound as the preset condition.

Preferably, the control module is a vibration control module which directly detects the vibration to control the switch to be energized or not.

Preferably, the vibration control module includes the vibration sensor which detects the vibration and outputs the sensing signal, and the signal amplification circuit which is connected with the vibration sensor and the switch, amplifying the sensing signal and then outputting the sensing signal to the switch to energize the switch.

Preferably, the vibration control module also includes a comparator which is electrically connected between the signal amplification circuit and the circuit; the comparator compares the voltage of the sensing signal with a preset reference voltage; and when the voltage of the sensing signal is greater than the reference voltage, the vibration control module controls the switch to be energized.

Preferably, the hose includes a tool connection end which is connected with the electric tool. The control module is arranged at a position in the hose near the tool connection end.

Preferably, the control module is sealed in the lateral wall of the hose.

Compared with the prior art, the vacuum cleaner of the present invention controls the vacuum cleaner to work by using a control module to sense the vibration generated after the startup of the electric tool, so the work of the vacuum cleaner and the electric tool is highly consistent when working; in addition, the vacuum cleaner includes an independent switch such that the vacuum cleaner and the electric tool can be connected to different power supplies, and then the problem where the voltage of the electric tool is insufficient due to voltage division by the vacuum cleaner is avoided. In such a way, the user is provided with convenience during working.

The present invention also discloses a vacuum cleaner which is used in combination with electric tools. The vacuum cleaner includes: a body capable of vacuuming, a handle installed on the body for being held by a user, a hose installed on the body, and a function selection switch arranged on the body. The function selection switch is operable to be located at a off gear where the vacuum cleaner and the power supply are disconnected, a on gear where the vacuum cleaner conducts the continuous vacuuming function, and a automatic gear where the vacuum cleaner automatically starts or stops working by sensing the vibration generated after the startup of a first electric tool.

Preferably, the handle is equipped with a trigger element which is electrically connected with the function selection switch. The function selection switch also includes a trigger gear where the trigger element controls the startup or stopping of the vacuum cleaner.

Compared with the prior art, the vacuum cleaner in the present invention selects different gears by setting the function selection switch such that the vacuum cleaner can be in different functional states to meet the user's demands in different cases. Thus, the vacuum cleaner of the present invention has a wide application.

BRIEF DESCRIPTION OF THE SEVERAL VIEWS OF THE DRAWINGS

The present invention is further described in detail with reference to the attached drawings and embodiments.

DETAILED DESCRIPTION OF THE INVENTION

As shown in FIG. 1, the first embodiment of the present invention provides a combination of electric tools, which includes a first electric tool 1 and a second electric tool 100. The second electric tool 100 can automatically respond to the startup of the first electric tool 1 to be started.

The first electric tool 1 may be a sander, table saw, miter saw, electric circular saw, jig saw, angle grinder, electric router, electric hammer, electric drill, belt sander, table jig saw, or marble stone machine, etc. Of course, other electric tools can also be used, but are not described in detail due to limit of the text.

The second electric tool 100 is selected from among a vacuum cleaner, water gun, blower, or portable working lamp. In this embodiment, only the case where the second electric tool 100 is a vacuum cleaner 100 is described. The second electric tool 100 in other cases is basically the same as the vacuum cleaner and therefore is not described due to the limit of the text.

Figure 1A:
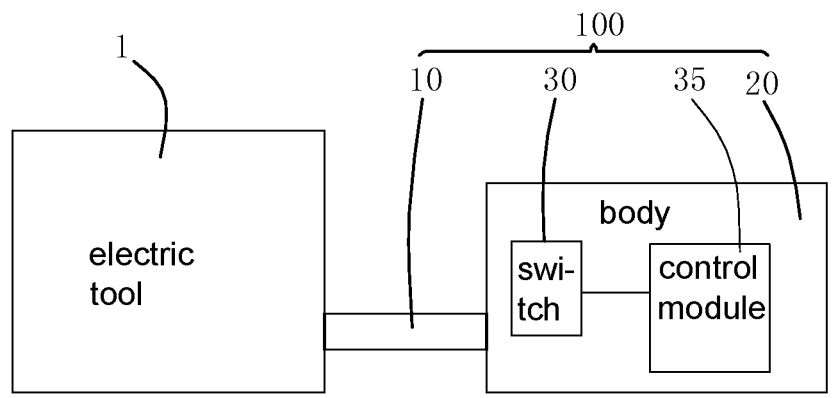
FIG. 1(a) and FIG. 1(b) show a schematic diagram of a vacuum cleaner in the first embodiment of the present invention.
Figure 1B:
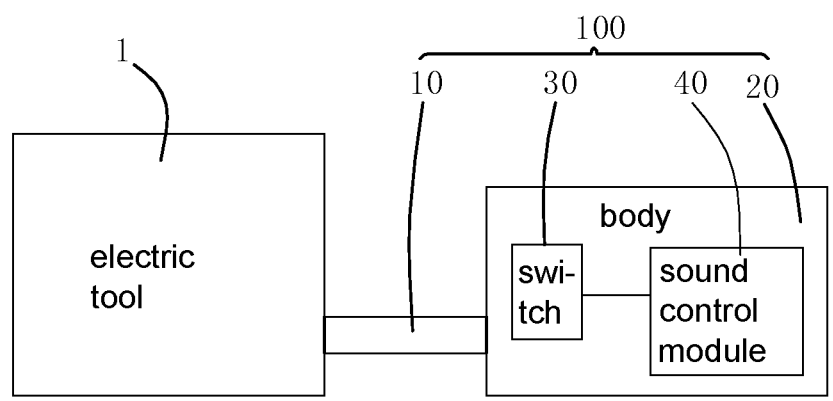
Figure 3:
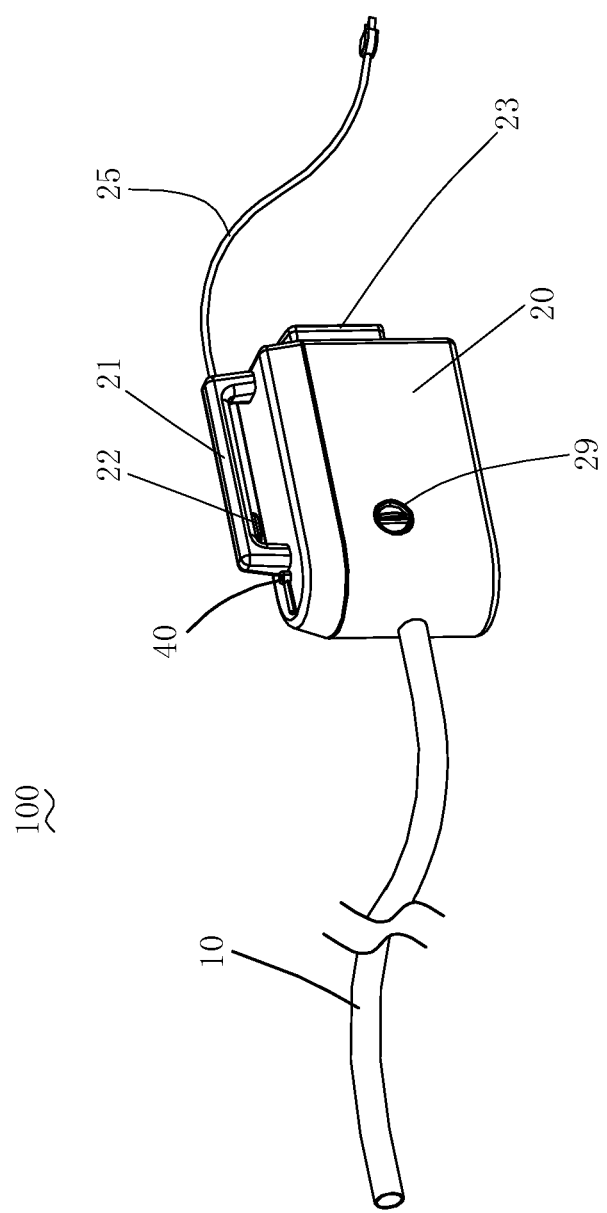
FIG. 3 is a three-dimensional view of the vacuum cleaner in the first embodiment of the present invention.

Refer to FIG. 1(a), FIG. 1(b), and FIG. 3. The vacuum cleaner 100 includes: a hose 10, a body 20, a battery pack 23, a power cable 25, a function selection switch 29, an electronic switch 30 and a control module 35.

The hose 10 is connected with the first electric tool 1. When the first electric tool 1 works, the generated residues enter the body 20 from hose 10 by suction of the vacuum cleaner 100. In this embodiment, the first electric tool 1 has a dust removal portion. The hose 10 is directly connected with the dust removal portion. The shape of the hose 10 can be designed according to the structure of the dust removal portion. Preferably, the dust removal portion of the first electric tool 1 is tubular, and the hose 10 is also tubular and is made from a flexible material such that the hose 10 can be sleeved with the dust removal portion and then the user can conveniently install the hose 10 at the dust removal portion.

Of course, the hose 10 may be not connected with the first electric tool 1. When the first electric tool 1 is working, the free end of the hose 10 can be placed near the head of the first electric tool 1, so the vacuum cleaner 100 and the first electric tool 1 are used in a combined way to remove the residues generated when the head processes workpieces by suction.

To enable the vacuum cleaner 100 to be used in combination with many kinds of electric tools, the hose 10 and the body 20 are split. The hose 10 can be provided with at least two free ends, wherein one free end is connected with the body 20, and the rest can be manufactured into different dimensions or shapes according to the needs of different electric tools. Of course, a plurality of hoses of the vacuum cleaner 10 with different dimensions or shapes can be configured according to demands; as long as one free end is connected with the body 20, the dimensions and shapes of the rest can be designed on the basis of the actual situation. Those skilled in this field may make other modifications which shall be within the protection scope of the present invention as long as the functions and effects are identical with or similar to those of the preset invention.

The body 20 is connected with the hose 10 and can perform vacuuming. The body 20 includes a motor (not shown in the figure), a fan (not shown in the figure) installed on the motor, a filter component (not shown in the figure) for filtering residues in the gas, and a storage box (not shown in the figure) for storing the residues. When the vacuum cleaner 100 works, the motor drives the fan to rotate at a high speed; the gas with the residues enters the body 20 from the hose 10; the filter components filters the gas, and then clean air will be discharged out of the vacuum cleaner 100, while the residues and dust will be stored in the storage box.

The body 20 is provided with a handle 21 for being held by the user, so the vacuum cleaner 100 is of high portability. The handle 21 is provided with a trigger element 22 which is electrically connected with the function selection switch 29 and used in combination with the function selection switch 29. In addition, the trigger element 22 has a resetting function, and when pressed, it can automatically bounce and reset. In this embodiment, a return spring is arranged between the trigger element 22 and the inner wall of the handle 21.

The battery pack 23 is installed on the body 20 and can supply power for the motor to enable the vacuum cleaner 100 to work. The vacuum cleaner 100 can be connected to the external DC power supply by the power cable 25; and when the power cable 25 is connected to the external DC power supply, the battery pack 23 can be charged, and meanwhile the vacuum cleaner 100 can be started to work. Thus it can be seen that the battery pack 23 and the external DC power supply both can be used as the power supply of the vacuum cleaner 100.

The first electric tool 1 and the second electric tool 100 respectively include or are connected to independent power supplies, thus avoiding the problem of voltage insufficiency because the two share the same power supply. That is to say, the first electric tool 1 can adopt the battery pack or the DC power supply to supply power; when the first electric tool 1 and the second electric tool 100 both use the battery pack to supply power, the two respectively include independent battery packs; when the two adopt the DC power supply, preferably, the two are respectively connected to different power sockets, thus avoiding voltage insufficiency of one of the two due to voltage division.

The function selection switch 29 is arranged on the body 20 and connected with the power supply, and includes four gears, namely the off, on, automatic, and trigger gears. The function selection switch 29 is operable to shift among the four gears. In addition, corresponding to the on, automatic, and trigger gears, the vacuum cleaner 100 respectively has a continuous vacuuming function, automatic vacuuming function and a triggered vacuuming functions.

When the function selection switch 29 is located at the off gear, the vacuum cleaner 100 cannot be started and is completely disconnected with the power supply. At this time, the user can safely dismantle or replace the battery pack 23.

When the function selection switch 29 is located at the on gear, the vacuum cleaner 100 conducts continuous vacuuming function, which means that the vacuum cleaner 100 continuously works after startup. This is applicable to a relatively large area, or the case where the user uses the first electric tool 1 to continuously process the workpieces, or the case where the user is required to frequently use the first electric tool 1 during working. In such cases, the vacuum cleaner 100 works without stopping to avoid frequent startup, thus saving electrical energy and prolonging the service life.

When the function selection switch 29 is located at the automatic gear, the vacuum cleaner 100 conducts the function of automatic vacuuming, and automatically starts or stops working by sensing the vibration generated after the startup of the first electric tool 1. At this time, the user is only required to operate the first electric tool 1 to process the workpieces, and is not required to additionally operating the vacuum cleaner 100, so convenience is brought to the user; the vacuum cleaner 100 senses the vibration generated after the startup of the first electric tool 1, so the work of the vacuum cleaner 100 and the first electric tool 1 is highly consistent, which means that after the first electric tool 1 is started, the vacuum cleaner 100 will immediately start to work. The automatic vacuuming function is applicable to the case where the vacuum cleaner 100 and the first electric tool 1 are used in combination, which requires the user to process the workpieces continuously. If the vacuum cleaner 100 is controlled to be automatically started by setting the control module 35, the user is not required to frequently operate the vacuum cleaner 100, and the work of the first electric tool 1 and the vacuum cleaner 100 is highly consistent, so the vacuum cleaner 100 can absorb the dust or fragments generated by the first electric tool 1.

When the function selection switch 29 is located at the trigger gear, the vacuum cleaner 100 conducts the triggered vacuuming function, and the user can lift and control the vacuum cleaner 100 to be started to stop working by a single hand. In this embodiment, when the function selection switch 29 is shifted to the trigger gear, whether the vacuum cleaner 100 is started is controlled by the trigger element 22, which means that when the user presses the trigger element 22, the vacuum cleaner 100 will be started immediately, when the trigger element 22 is released, the vacuum cleaner 100 will stop working immediately.

When the vacuum cleaner 100 is required to work in many areas, the user needs to lift the vacuum cleaner 100 with one hand, and hold the hose 10 with another hand to aim at the area to be vacuumed. At this time, if it fails to lift and control the vacuum cleaner 100 to be started to stop working with one hand, the user is required to loosen the hose 10, start the vacuum cleaner 100 and then hold the hose 10 to work, when the work in the current area is done, the user is required to loosen the hose 10 again and power off the vacuum cleaner 100; and when moving to another area which needs vacuuming, the above operation is repeated, so such vacuuming operation is very complicated. Of course, the user can also keep the vacuum cleaner 100 in a working state, but the vacuum cleaner 100 will consumes the electric energy of the battery pack 23 in the process that it is moved to the next area after the work in an area is done. Thus it can be seen that, in this embodiment, by setting the trigger element 22, which controls the startup or stopping of the vacuum cleaner 100 only when the function selection switch 29 is shifted to the trigger gear, on the handle 21, the user can lift and control the startup or stopping of the vacuum cleaner 100 with a single hand, which allows the user to conveniently start the vacuum cleaner 100 when working in many areas and release the trigger element 22 top stop the vacuum cleaner 100 during moving among areas, and thus, the electric energy of the battery pack 23 is not consumed during movement.

By setting the continuous vacuuming function, automatic vacuuming function, and triggered vacuuming function, the vacuum cleaner 100 has a wide application scope. Moreover, by setting a function selection switch 29 to control the shift of the vacuum cleaner 100 among the function states, the operation by the user is very simple and convenient.

When the function selection switch 29 of the vacuum cleaner 100 is located at the automatic gear, the control module 35 can control the vacuum cleaner 100 to work by the electronic switch 30. Therefore, in the description where the control module 34 controls the work of the vacuum cleaner 100, it is defaulted so that the function selection switch 29 is located at the automatic gear. Of course, the vacuum cleaner 100 may not include the function selection switch 29, and be started or stopped by turning the electronic switch 30 on or off. In this way, the vacuum cleaner 100 can work completely under the control of the control module 35.

The electronic switch 30 is connected with the function selection switch 29, or integrated in the function selection switch 29. When the function selection switch 29 is shifted to the automatic gear, the startup or stopping of the vacuum cleaner 100 is controlled by turning the electronic switch 30 on or off. When the electronic switch 30 is energized, the electric energy of the power supply can enter the motor such that the motor is energized and starts to work; when the electronic switch 30 is not energized, the motor fails to obtain the electric energy from the power supply and therefore cannot be started. In this embodiment, the electronic switch 30 is a triode or a relay.

The control module 35 is arranged on the vacuum cleaner 100 and can detect the vibration generated when the first electric tool 1 is working so as to automatically control the startup or stopping of the second electric tool 100. In this embodiment, the control module 35 is electrically connected with the electronic switch 30, and controls the electronic switch 30 to be energized or not to realize control over the work of the body 20 through the electronic switch 30 when the function selection switch 29 is located at the automatic gear.

After startup, the first electric tool 1 generates vibration, which means that the motor or the first electric tool 1 generates vibration when processing the workpieces. The vibration brings the medium adjacent to the first electric tool 1 to vibrate at the same time, such as air or the hose 10 connected with the first electric tool 1. The control module controls the electronic switch 30 to be energized or not by sensing the vibration of the medium to control the work of the vacuum cleaner 100.

Figure 2A:
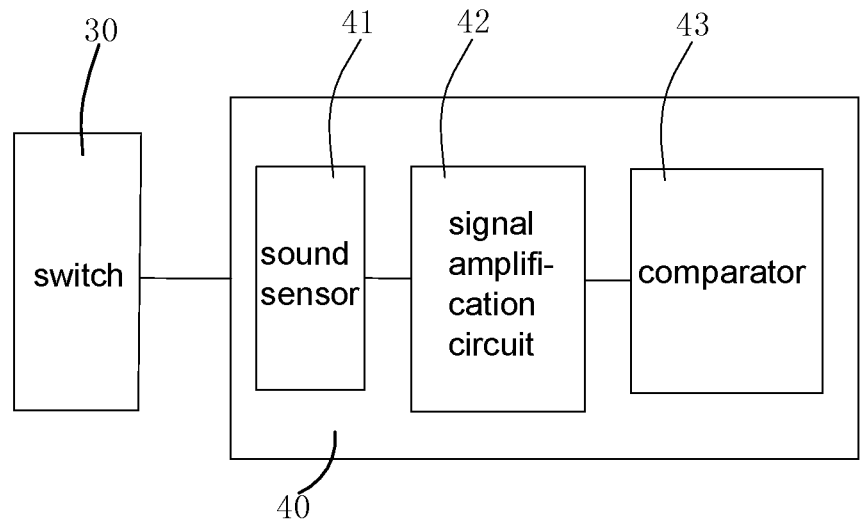
FIG. 2(a) is a functional block diagram of the vacuum cleaner in FIG. 1(a).

Refer to FIG. 1(a), FIG. 1(b), and FIG. 2(a) together. In this embodiment, the control module 35 is a sound control module 40 which controls the work of the vacuum cleaner 100 by sensing the sound signal generated by the vibration. Because the vibration generates the sound signal after the first electric tool 1 is started, while the sound signal is transmitted in a waveform, by setting the sound control module 40 to sense the signal so as to indirectly detect the vibration generated by the first electric tool 1, the work of the vacuum cleaner 100 can be controlled by detecting the vibration of the first electric tool 1.

The sound signal generated by the vibration of the first electric tool 1 after startup is the working sound signal thereof, which means that the working sound signal can be used as the sound signal generated when the motor rotates, or the sound signal generated when the first electric tool 1 processes the workpieces, or the sound signal generated by superimposing and mixing the former two sound signals. In this embodiment, the sound control module 40 controls the vacuum cleaner 100 according to the superimposed and mixed sound signal to realize automatic starting of the vacuum cleaner 100 under the control of the sound control module 40 when the first electric tool 1 begins to process the workpeices.

The sound control module 40 is used for detecting the working sound signal, so it can be arranged at an optional position on the vacuum cleaner 100, may be located on the body 20, and may be located at a position in the hose 10 close to the first electric tool 1. In this embodiment, the sound control module 40 is arranged on the top of the body 20 of the vacuum cleaner 100 and close to one side where the hose is arranged. In this way, the sound control module 40 can relatively accurately sense the working sound signal of the first electric tool 1 to control the startup of the vacuum cleaner 100.

It is understood that the electronic switch 30 can be integrated in the sound control module 40 and electrically connected with the function selection switch 29; the electronic switch 30 can also be arranged in the function selection switch 29 and electrically connected with the sound control module 40. Of course, the sound control module 40, the electronic switch 30 and the function selection switch 29 can be installed on the same circuit board and the three are connected by circuits on the circuit board.

Figure 6:
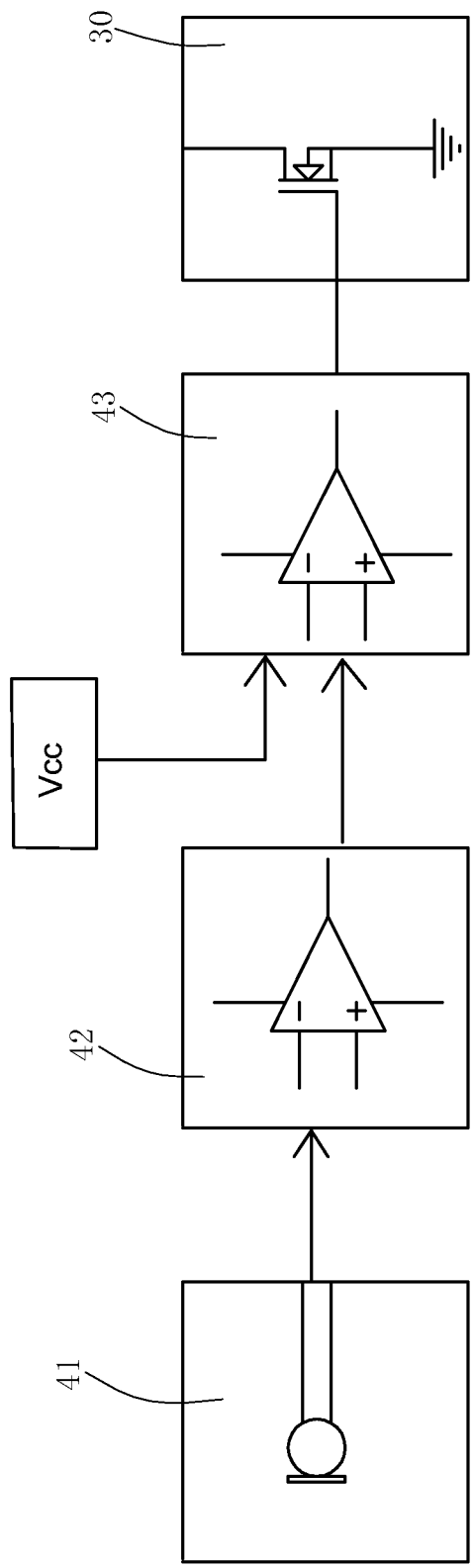
FIG. 6 is a functional block diagram of FIG. 2 showing more details.

Refer to FIG. 1 and FIG. 6, the sound control module 40 includes a sound sensor 41, a signal amplification circuit 42 and a comparator 43.

The sound sensor 41 is used for sensing the sound signal and converting the sound signal into the sensing signal. When the sound signal is transmitted in the medium, it exists in the waveform. The sound sensor 41 converts the sound signal into the electric signal by sensing the waveform and outputting the analogue signal simulating the frequency and period of the waveform. The sound sensor 41 may be a capacitor type sound sensor or an electromagnetic sound sensor, preferably is a capacitor type sound sensor.

The sound sensor 41 is located on the external surface of the body 20 and easily senses the sound signal there. In this embodiment, the sound sensor 41 is arranged on the top of the body 20 and exposed on the outside of the body 20; and when the vacuum cleaner 100 works, the sound sensor 41 is located on one side of the vacuum cleaner 100 close to the first electric tool 1. In this way, the sound sensor 41 can more accurately sense the working sound signal of the first electric tool 1.

The signal amplification circuit 42 is electrically connected with the sound sensor 41, receives the sensing signal and amplifies the sensing signal by a fixed factor; The sensing signal generated by the sound sensor 41 is relatively weak and needs to be amplified for further processing.

The comparator 43 is used for conducting the threshold function, which means setting a certain limit for startup of the vacuum cleaner 100. The comparator 43 can receive the sensing signal and control the electronic switch 30 to be energized or not. In this embodiment, the comparator 43 is respectively electrically connected with the signal amplification circuit 42 and the electronic switch 30 and includes a first input end, a second input end and an output end. The first input end is connected with the signal amplification circuit 42 and receives the sensing signal amplified by the signal amplification circuit 42. The second input end is connected with a reference voltage Vcc for comparing the reference voltage with the sensing signal. The output end is connected with the electronic switch 30.

When the first input end receives the sensing signal which is amplified by the signal amplification circuit 42, the comparator 42 will compare the voltage of the first input end and that of the second input end; if it is found that the voltage of the first input end is higher than that of the second input end, a high voltage is output to the electronic switch 30 from the output end to energize the electronic switch 30, and thus, automatic control over the startup of the vacuum cleaner 100 is realized, which means that the situation that the second electric tool 100 responses to the startup of the first electric tool 1 to be started is realized. When the voltage of the first input end is lower than that of the second input end, a low voltage is output from the output end, and the electronic switch 30 is not energized so that that the second electric tool 100 stops working.

It can be understood that the reference voltage Vcc input to the second input end may vary with needs. Preferably, the second input end is connected with an adjustable resistor. In such a way, the reference voltage Vcc input to the second input end can be adjusted conveniently, so the situation where the reference voltage Vcc is input to the second input end according needs is realized. The comparator 43 compares the amplified sensing signal with the reference voltage Vcc, so the signal amplification signal 42 amplifies the sensing signal by a fixed factor; whether the voltage of the amplified sensing signal is greater than the reference voltage Vcc is determined by the strength of the sensing signal output by the sound sensor 41, and the strength of the sensing signal is determined by the volume of the sound in the working environment, therefore the reference voltage Vcc is relatively high, only the sound in the working environment is relatively loud can the voltage of the sensing signal be greater than the reference voltage Vcc. Thus, by adjusting the resistance of the resistor to control the reference voltage input to the second input end, the situation that the different startup conditions of the vacuum cleaner 100 are set according to the volume of the sound in the working environment is realized.

As mentioned above, the vacuum cleaner 100 can be started to work according to a sound signal a specific decibel, which means that when the comparator 43 judges that the voltage of the first input end is equal to that of the second input end, the electronic switch 30 is energized, and the vacuum cleaner can be started when sensing a fixed sound signal. In such a way, the vacuum cleaner 100 is not started to work by the interference of other sound signals in the environment.

Of course, the signal amplification circuit 42 can be integrated in the sound sensor 41 or comparator 43 such that the sound sensor 41 or comparator 43 has the signal amplification function.

The vacuum cleaner 100 may not include the comparator 43. In this way, the comparator 43 is connected with the electronic switch 30. When the sound sensor 41 senses the sound signal, the transmitted sensing signal is amplified by the signal amplification circuit 42 and then output to the electronic switch 30; when the electronic switch 30 is energized after receiving the sensing signal, and then the vacuum cleaner 100 starts to work. In such a way, the work of the first electric tool 1 and the vacuum cleaner 100 is highly consistent. Of course, if the comparator 43 is integrated in the sound sensor 41, the sound sensor 41 is directly connected with the electronic switch 30, and whether the electronic switch 30 is energized or not is controlled by whether the sound sensor 41 sends the working sound signal.

Figure 2B:
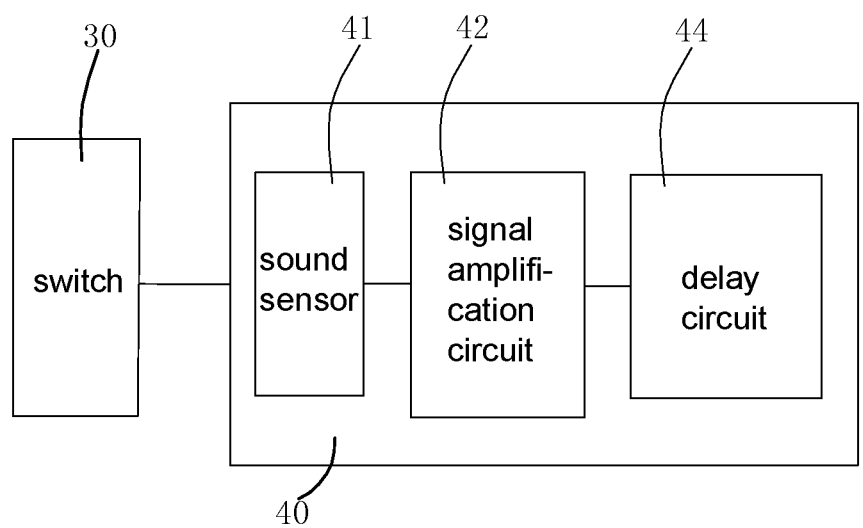
FIG. 2(b) is another functional block diagram of the vacuum cleaner in FIG. 1(a).

Furthermore, when the vacuum cleaner 100 does not include the comparator 43, the sound control module 40 can be provided with a delay startup function 44 as shown in FIG. 2(*b*). Only when the sensed sound signal lasts for a period of time, the sound control module 40 starts the vacuum cleaner 100 to work. In such cases, the sound control module 40 may include a counter; when sensing the sound signal, the counter begins to count; if the sound signal lasts, the counter keeps counting; after a preset period of time, the sound control module 40 controls the electronic switch 30 to be energized to start the vacuum cleaner 100; if the sound signal stops during counting, while the counter does not reach the preset period of time, the counter stops counting, clears, and waits to begin counting again when the sound signal appears. At this time, the sound control module 40 controls the electronic switch 30 to be not energized. In such a way, the situation where the sound control module 40 controls the electronic switch 30 to be energized only after the sound signal lasts a period of time, for example, the sound signal generated when the saw blade cuts the workpieces or the sound signal of the motor both last a period of time when cutting is performed and can start the vacuum cleaner 100, while sounds generated by speaking or knocking cannot start the vacuum cleaner 100. Thus, the vacuum cleaner 100 is not easily started to work by the interference of other sound signals in the environment. After the startup of the vacuum cleaner 100, if the sound signal stops, the sound control module 40 immediately controls the electronic switch 30 to be not energized to realize automatic stop of the vacuum cleaner 100.

Those skilled in this field can realize the threshold function of the compactor 43 by other means. Due to the limit of the text, no more description of those means is provided, but as long as the realized functions and achieved effects are identical or similar with those of the present invention, they all shall be within the protection scope of the present invention, The sound control module 40 and the electronic switch 30 together form a sound operated switch to control the work of the vacuum cleaner 100, so the situation that the second electric tool 100 can respond to the startup of the first electric tool 1 to be started is realized, the work of the first electric tool 1 and the second electric tool 100 are highly consistent, meanwhile the first electric tool 1 and the second electric tool 100 may respectively include different power supplies to avoid the problem of voltage insufficiency when the two share the same power supply and provide great convenience to the work of the user.

Figure 4:
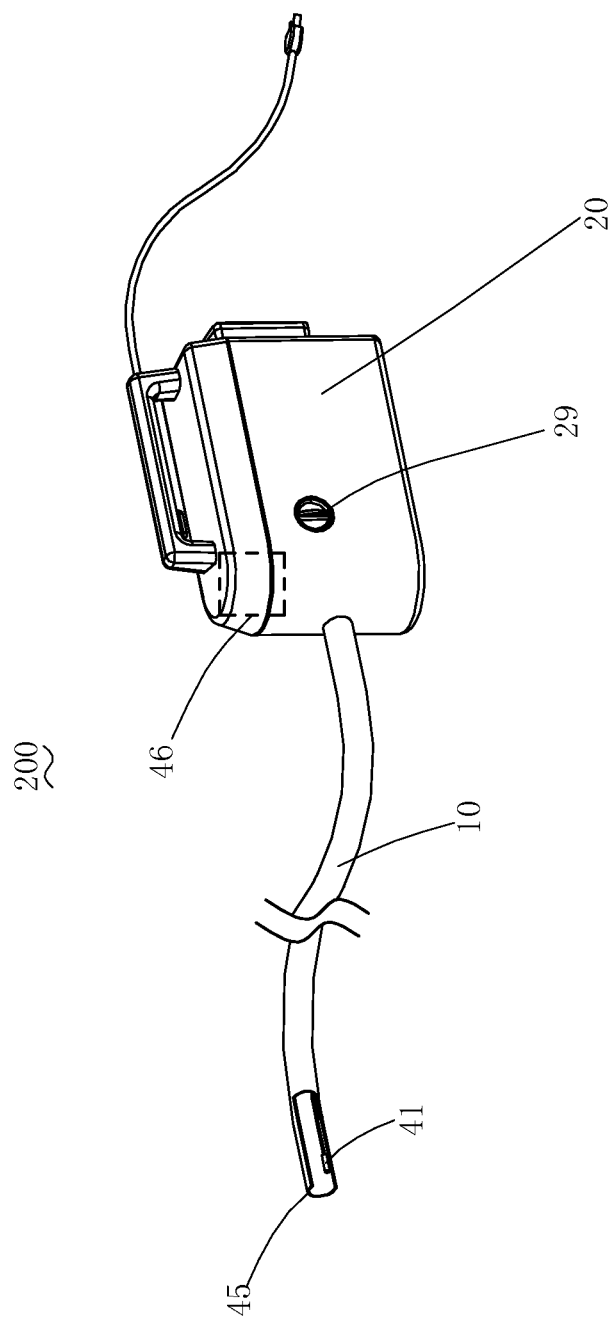
FIG. 4 is a three-dimensional view of a vacuum cleaner in a second embodiment of the present invention, wherein the end of a hose for connecting electric tools is partly split.

Refer to FIG. 4. The second embodiment of the present invention provides a second electric tool 200. In this embodiment, the second electric tool 200 is a vacuum cleaner 200.

The functions and structure of the second electric tool 200 are basically the same with those of the electric tool 100 provided in the first embodiment, so the marks of the same functional and structural elements are identical. The difference between the two lies in that: as shown in FIG. 1 and FIG. 4, the control module 35 is a vibration control module 46 arranged on the vacuum cleaner 200. The vibration control module 46 directly senses the vibration generated by the first electric tool 1 after startup to automatically control the work of the second electric tool 200.

The vibration control module 46 includes a vibration sensor 47, a signal amplification circuit 42 and a comparator 43.

The hose 10 includes a tool connection end 45 which is connected with the first electric tool 1. The vibration sensor 47 is located at a position in the hose 10 and close to the tool connection end 45, which means that after the hose 10 is connected with the first electric tool 1, the vibration sensor 47 is located at a position in the hose 10 and close to the first electric tool 1, so, the vibration sensor 47 is very close to the first electric tool 1; and when the first electric tool 1 works, the vibration sensor 47 generates vibration and drives the connected hose 10 to vibrate together. Because the vibration sensor 47 is located at a position in the hose 10 and close to the first electric tool 1, it can accurately sense the vibration and outputs the sensing signal. After sensing the vibration generated when the first electric tool 1 works, vibration sensor 47 outputs the sensing signal in the waveform; when the vibration amplitude of the first electric tool 1 becomes higher during working, the voltage of the sensing signal output by the vibration sensor 47 gets better.

The signal amplification circuit 42 is connected with the vibration sensor 47, amplifies the sensing signal by a certain factor and outputs the amplified signal to the electronic switch 30 so as to control the electronic switch 30 to be energized such that the vacuum cleaner 200 is started.

When detecting the vibration generated by the electric tool 1 during working, the vibration sensor 47 outputs the sensing signal. The signal amplification circuit 42 receives the sensing signal, amplifies the signal and outputs the amplified signal to the electronic switch 30 to control the electronic switch 30 to be energized, and then the vacuum cleaner 200 is started. When the vacuum cleaner 200 is working, if the vibration stops, the vibration sensor 47 does not output the sensing signal, and then the electronic switch 30 loses the reference voltage to be turned off, so the vacuum cleaner 200 stops working.

To avoid the situation that the vacuum cleaner 200 is started by the vibration generated when the user drags or installs the hose 10 on the first electric tool 1, the vibration control module 46 can be provided with a comparator which is identical with the comparator 43 provided in the first embodiment, so repeated description is omitted here. In this way, when the voltage of the sensing signal is greater than the reference voltage, the comparator 43 outputs a voltage to energize the electronic switch 30, then the vacuum cleaner 200 is started; when the voltage of the sensing signal is smaller than the reference voltage, the comparator 43 outputs a low voltage, and the electronic switch 30 is not energized, so the vacuum cleaner 200 stops working.

As mentioned above, the vibration control module 46 further controls the electronic switch 30 to be energized or not by directly sensing the vibration generated by the first electric tool 1 after startup, thus realizing automatic control over the work of the vacuum cleaner 200.

To prevent dust from polluting the vibration sensor 47, the vibration sensor 47 can be sealed. Preferably, the vibration sensor 47 can be sealed in the lateral wall of the hose 10. In such a way, the vibration sensor 47 can more accurately sense the vibration generated by the first electric tool 1 during working such that the vibration control module 46 can more accurately control the startup of the vacuum cleaner 200, and then the work of the vacuum cleaner 200 and the first electric tool 1 is highly consistent.

Correspondingly, the vibration control module 46 may be integrally arranged at a position in the hose 10 and close to the tool installation end 45, and sealed in the lateral wall of the hose 10; the vibration control module 46 and the electronic switch 30 are connected by electric wires, and thus, space setting in the body of the vacuum cleaner 200 can be more flexible.

Of course, the vibration control module 46 in this embodiment may be replaced by the sound control module 40 in the first embodiment; the sound sensor 41 or the whole sound control module 40 may be arranged in the hose 10 in the same way mentioned above, and also sealed in the lateral wall of the hose 10; in this way, the sound sensor 41 is closer to the first electric tool 1, so the sound control module 40 can more accurately control the startup of the vacuum cleaner and is not interfered by the noises in the environment.

Of course, the control module 35 may also include the sound control module 40 and the vibration control module 46 at the same time and realize control over the second electric tool by the cooperation of the two modules. For example, only when the two modules sends the signals to control the startup of the second electric tool at the same time, the second electric tool can be started to work; otherwise, other interference factors are regarded to exist. Such condition can improve the anti-interference of the control module 35.

Figure 5:
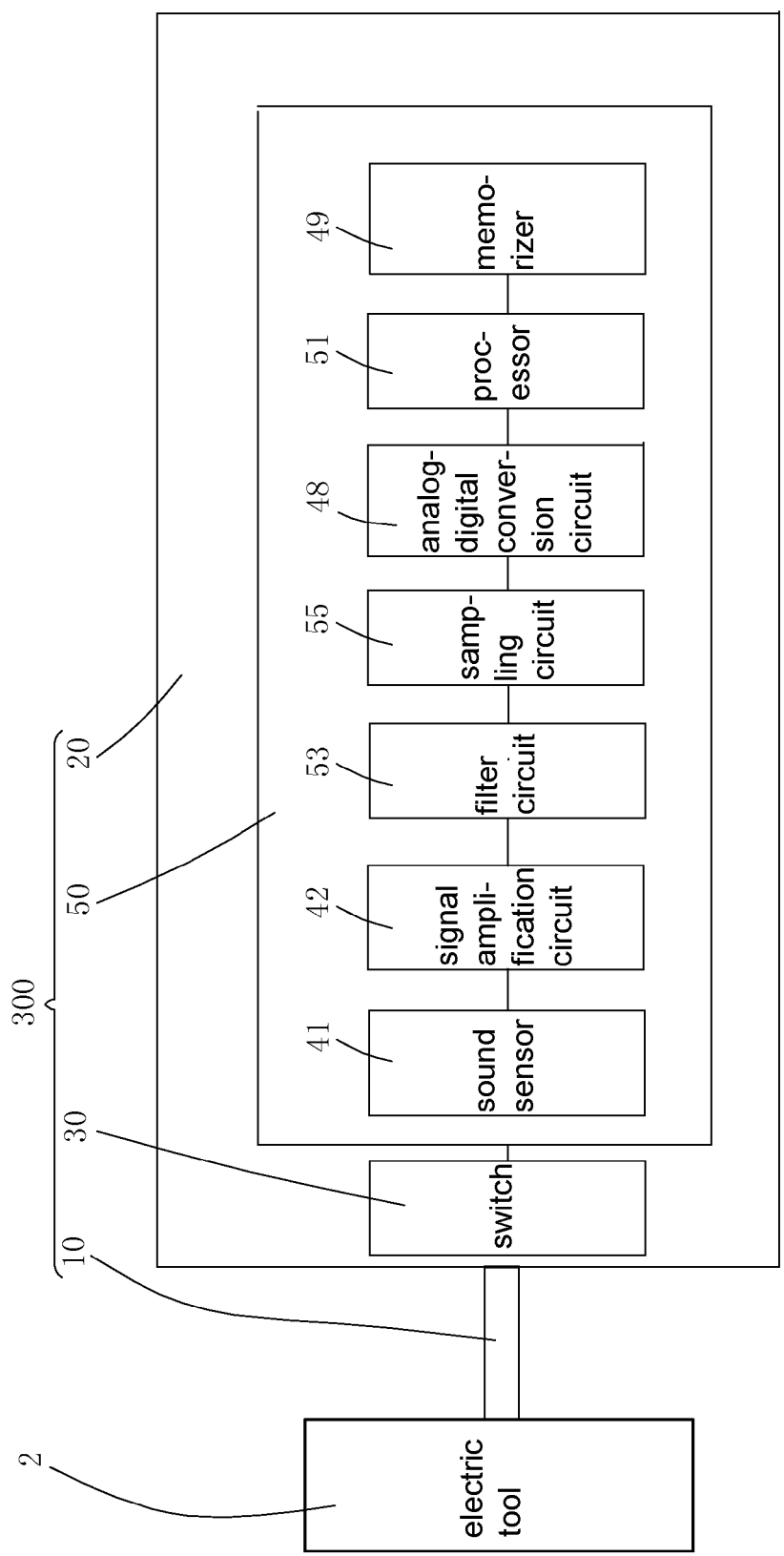
FIG. 5 is a schematic diagram of a vacuum cleaner in the third embodiment of the present invention.

Refer to FIG. 1 and FIG. 5. The second electric tool 300 provided in the third embodiment of the present invention is basically identical with the second electric tool 100 provided in the first embodiment, and the marks of the same functional and structural elements are identical with those in the first embodiment. The difference between the two lies in that: in this embodiment, the second electric tool 300 is a vacuum cleaner 300, and the control module 35 of the vacuum cleaner 300 is a sound control module 50. The sound control module 50 includes a sound sensor 41, a signal amplification circuit 42, an analog-digital conversion circuit 48, a memorizer 49 and a processor 51.

The analog-digital conversion circuit 48 is electrically connected with the signal amplification circuit 42, and converts the analogue signal amplified by the signal amplification circuit 42 into the digital signal. It can be understood that the analog-digital conversion circuit 48 can be independent from the sound sensor 41 or integrated in the sound sensor 41. Those skilled in this field can select the means according to actual demands.

The memorizer 49 stores a preset condition; when the digital signal meets the preset condition, this represents that the currently sensed sound signal is the working sound signal of the first electric tool 1, which means that the first electric tool 1 begins to work and the vacuum cleaner 300 is required to be started to work.

The preset condition is at least one feature value, such as the frequency, amplitude, period, peak value, valley value or optional combinations thereof. In this embodiment, the preset condition consists of the frequency and the amplitude; when the frequency and amplitude of the current digital current are identical with those of the present condition, it is regarded that the currently sensed sound signal is the working sound signal generated by the first electric tool 1. When setting the preset condition, the corresponding situation of the working sound signal of the matched first electric tool 1 is used, which means that the feature value of the sound signal generated by superposing the sound signal of the motor and the sound signal generated by processing the workpieces when the first electric tool 1 is in the working state is used as the preset condition. Of course, the feature value is not limited to the sound generated by superposing the sound signal of the motor and the sound signal generated by processing the workpieces, and may be the sound signal of the motor or the sound signal generated by processing the workpieces only.

Of course, the preset condition may also be set by other means. Those skilled in this field may make other modifications which shall be within the protection scope of the present invention as long as the functions and effects are identical with or similar to those of the preset invention.

The processor 51 is electrically connected with the analog-digital conversion circuit 48 and the memorizer 49, receives the digital circuit, reads the preset condition from the memorizer 49, analyzes if the digital signal meets the preset condition, and if so, turns on the electronic switch 30. In this embodiment, after receiving the digital signal, the processor 51 will identify the frequency and amplitude of the sound signal generated when the motor rotates from the digital signal, compares the frequency and amplitude with those of the preset condition, and if they are identical, turn on the electronic switch 30, and then the vacuum cleaner 300 is started; when the sound signal stops, the sensing signal is not generated, and the processor 51 turns off the electronic switch 30, so the vacuum clean 300 will automatically respond to the stopping of the first electric tool 1 to stop working.

When turns on the electronic switch 30, the processor 51 continuously receives the digital signal and judges if the digital signal meets the preset condition, if so, controls the electronic switch 30 to be kept on, if not, turns off the electronic switch 30, and turns on the electronic switch when the digital signal meets the preset condition again.

By the sound control module 50 in this embodiment, the work of the vacuum cleaner 300 and the first electric tool 1 is highly consistent; by determining if the working sound signal is generated by the first electric tool 1 according to the preset condition, the vacuum cleaner 300 is not interfered with by outside noises, and thus, the use convenience for the user is improved.

To make the digital signal received by the processor 51 more in order, a filter circuit 53 can be arranged between the sound sensor 41 and the analog-digital conversion circuit 48. The filter circuit 53 can filter the analogue signal generated by the sound sensor 41 such that the analogue signal entering the analog-digital conversion circuit 48 is more in order and that the digital signal which is converted by the analog-digital conversion circuit 48 and enters the processor 51 is more in order. In this embodiment, the filter circuit 53 is electrically connected between the signal amplification circuit 42 and the analog-digital conversion circuit 48.

Figure 7:
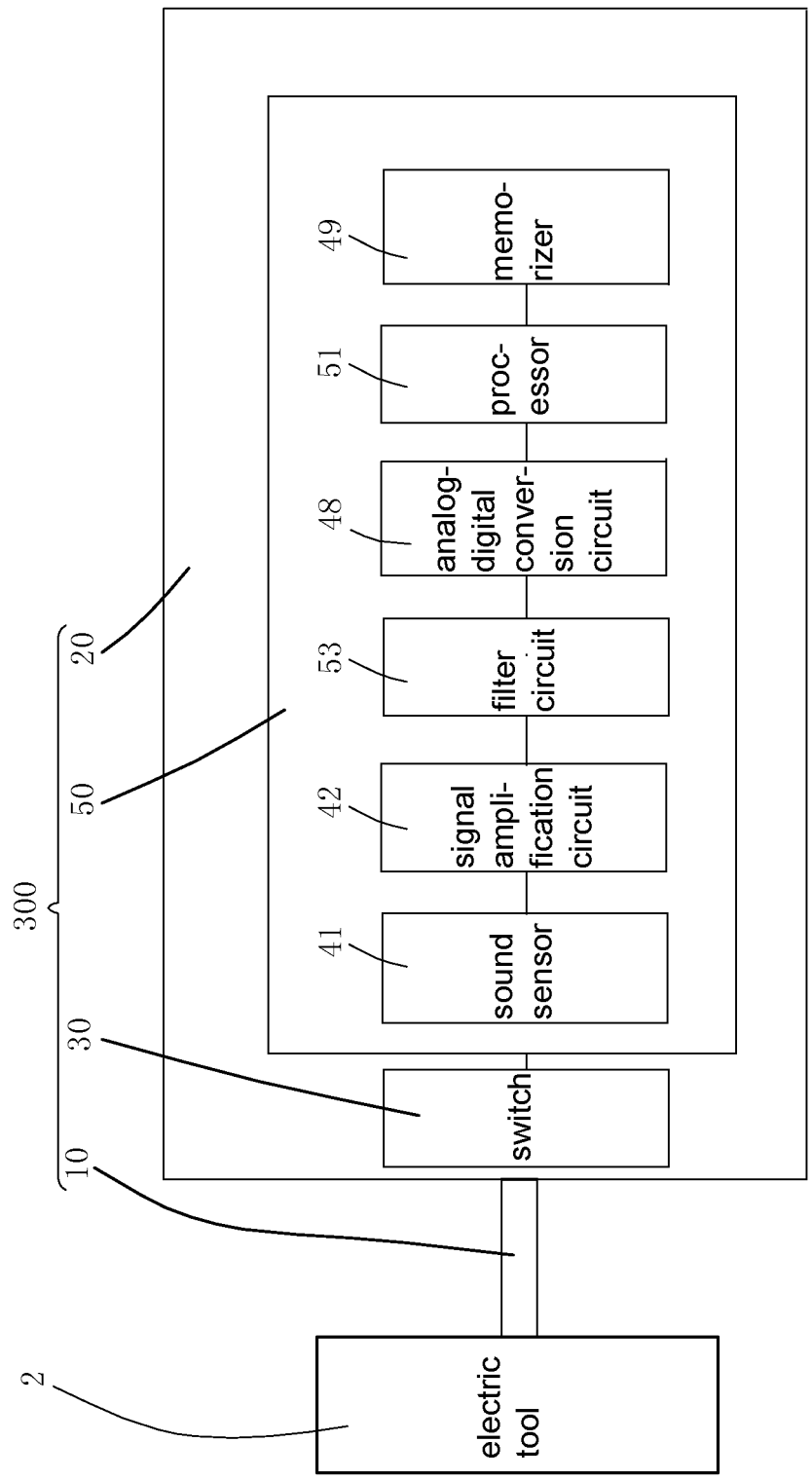
FIG. 7 is a schematic diagram of a vacuum cleaner in the other embodiment of the present invention.

To reduce energy consumption of the sound control module 50, a sampling circuit 55 can be arranged between the sound sensor 41 and the analog-digital conversion circuit 48. The sampling circuit 55 is a sampling circuit which samples the analogue signal generated by the sound sensor 41 at interval and transmits the acquired analogue signal to the analog-digital conversion circuit 48. In such a way, the analog-digital conversion circuit 48 is only required to convert the acquired analogue signal into the digital signal and transmit the digital signal to the processor 51, while the processor 51 is only required to analyze the data transmitted by the analog-digital conversion circuit 48, such that the workloads of the analog-digital conversion circuit 48 and the processor 51 are reduced, and then the energy consumption is reduced. In this embodiment, the sampling circuit 55 is electrically connected between the filter circuit 53 and the analog-digital conversion circuit 48. The sampling circuit 55 samples the analogue signal generated by the filter circuit 53 at intervals, and transmits the sampled result to the analog-digital conversion circuit 48. In other embodiment show in FIG. 7, the sound control module 50 does not include the sampling circuit 55, the analog-digital conversion circuit 48 is electrically connected with the filter circuit 53 directly. To ensure that the vacuum cleaner 300 is used in combination with different electric tools, the vacuum cleaner 300 may have a learning function, which means that the vacuum cleaner 300 can store the frequency, amplitude, period, peak value, valley value, or optional combinations thereof of the currently sensed sound signal into the memorizer as the preset condition. In this embodiment, the vacuum cleaner 300 can be provided with a button; when the button is triggered, the processor 51 begins to continuously receive the digital signal transmitted from the analog-digital conversion circuit 48; when the user re-triggers the button, the processor 51 will store the information such as the frequency and amplitude of the digital signal obtained by the previous trigger into the memorizer 49 as a preset condition. For example, the electric tool is a sander; when the user presses the button of the vacuum cleaner 300 and starts the sander, the processor 51 begins to continuously receive the digital signal converted by the analog-digital conversion circuit 48; when the user re-presses the button, the processor 51 stores the information such as the frequency and amplitude of the digital signal received before pressing the button into the memorizer 49, and then the vacuum cleaner 300 ends learning; and if the sander is not powered off or re-started, the sound control module 50 will control the vacuum cleaner 300 to work because of sensing the working sound signal of the sander and judging that the working sound signal meets the preset condition.

Of course, the preset condition can be set by pressing the button once. When the button is pressed, the processor 51 stores the feature value of the current sound signal into the memorizer 49 as the preset condition. Those skilled in this field may make other modifications which shall be within the protection scope of the present invention as long as the functions and effects are identical with or similar to those of the preset invention.

Of course, the sound sensor 41 in this embodiment may also be replaced by the vibration sensor, and correspondingly, the preset condition may be the frequency, vibration, period, peak value, valley value, or optional combinations thereof of the waveform sensing signal output from the vibration sensor.

In such a way, whether the current vibration is generated by the first electric tool 1 after the startup can be directly judged, so the vacuum cleaner is not interfered by other factors and can be started only when the first electric tool 1 works. Of course, after the sound sensor 41 is replaced by the vibration sensor, the vacuum cleaner 300 may also have the above learning function, which means that only the frequency, vibration, period, peak value, valley value, or optional combinations thereof of the waveform sensing signal output from the vibration sensor are required to used as the preset condition and stored in the memorizer 49 by the above means, and then combination of the vacuum cleaner and different electric tools can be realized.

The fourth embodiment of the present invention provides a method for starting the combination of electric tools in the above embodiment. The method includes: connecting the first electric tool and the second electric tool to different power supplies; starting the first electric tool, then the second electric tool will automatically respond to the startup of the first electric tool be started; and when the first electric tool stops, the second electric tool will automatically respond to the stopping of the first electric tool to stop working.

Of course, the step of connecting the first electric tool and the second electric tool to different power supplies can be interpreted that the first electric tool and the second electric tool are respectively connected to different DC power supplies, or respectively equipped with the battery pack, or one is connected the DC power supply, while the other is equipped with the battery pack. Here, the exhaustion of the means is omitted here, only the case where the first electric tool and the second electric tool are powered by different power supplies is needed.

By this method, the user is only required to operate the first electric tool and not required to operate the second electric tool to realize the situation that when the first electric tool is started, the second electric tool can also be automatically started, thus bringing great convenience to the user.

Inspired by the technical spirit of the present invention, those skilled in this field can adopt other technical schemes to realize the situation that the second electric tool automatically responds to the startup of the first electric to be started, for example: a wireless signal transmitter is installed on the first electric tool and a wireless signal receiver is installed on the second electric tool; when the first electric tool works, the wireless signal transmitter transmits the signal, and the wireless signal receiver receives the signal; the second electric tool is immediately started to work after the wireless signal receiver receives the signal; and in this way, the situation that the second electric tool responses to the startup of the first electric tool to be started can be realized. Those skilled in this field may make other modifications which shall be within the protection scope of the present invention as long as the functions and effects are identical with or similar to those of the preset invention.

Compared with the prior art, the combination of electric tools provided in the present invention realizes that the second electric tool can be automatically started without additional operation after the user starts the first electric tool to work by enabling the second electric tool to automatically respond to the startup of the first electric tool, thus bringing convenience to the user. In addition, the first electric tool and the second electric tool respectively include independent power supplies and therefore are not affected by the voltage during working and avoid the problem of voltage insufficiency aroused when the two share the same power supply.

Those skilled in this field shall be clear that the present invention also can have other realization manners. As long as the adopted technology is identical with or similar to that of the present invention, variations and substations made on basis of the present invention shall be embraced within the scope of the present invention.

We claim:

1. A combination of electric tools, comprising:
a first electric tool and a second electric tool respectively having an independent power supply, the second electric tool starting working automatically responding to the startup of the first electric tool,
wherein the second electric tool comprises: a control module which automatically starts the second electric tool by detecting vibration generated by the startup of the first electric tool, wherein the control module comprise a sound control module which receives sound signals generated by vibration to automatically start the second electric tool, wherein the second electric tool comprises a switch controlling the startup of the second electric tool; the sound control module comprises: a sound sensor which converts the sensed sound signal into the sensing signal and output the sensing signal, wherein the sound control module also comprises a delay circuit capable of counting time; when the sensing signal output by the sound sensor lasts a preset time length, the sound control module controls the switch to be energized.

2. The combination of electric tools according to claim 1, wherein the second electric tool stops working automatically responding to the stopping of the first electric tool.

3. The combination of electric tools according to claim 2, wherein the sound control module comprises: a signal amplification circuit which is connected with the sound sensor and the switch and amplifies and outputs the sensing signal to the switch.

4. The combination of electric tools according to claim 3, wherein the sound control module also comprises a comparator which is electrically connected between the signal amplification circuit and the switch; the comparator compares the voltage of the sensing signal with a preset reference voltage; and when the voltage of the sensing signal is greater than the reference voltage, the sound control module controls the switch to be energized.

5. The combination of electric tools according to claim 2, wherein the sound control module comprises:
a sound sensor, converting the sensed sound signal into an analog signal;
a signal amplification circuit, electrically connected with the sound sensor, and amplifying the sensing signal by a fixed factor;
an analog-digital conversion circuit, electrically connected with the signal amplification circuit, receiving the sensing signal and converting the analog signal into a digital signal;
a memorizer, storing a preset condition; and
a processor, electrically connected with the analog-digital conversion circuit and the memorizer, receiving the digital signal, reading the preset condition, and when the digital signal meets the preset condition, controlling the second electric tool to be started.

6. The combination of electric tools according to claim 5, wherein the preset condition is at least one feature value of the sound signal, and the feature value is the frequency, amplitude, period, peak value, valley value, or optional combinations thereof.

7. The combination of electric tools according to claim 5, wherein the sound control module also comprises a filter circuit which is electrically connected between the sound sensor and the analog-digital conversion circuit.

8. The combination of electric tools according to claim 5, wherein the second electronic tool is operable to store the frequency, amplitude, period, peak value, valley value of the sound signal, or optional combinations thereof into the memorizer as the preset condition.

9. The combination of electric tools according to claim 2, wherein the second electric tool is a vacuum cleaner, and the vacuum cleaner also comprises:
a battery pack as the power supply of the second electric tool;
a body for vacuuming;
a hose installed on the body, the hose comprises a tool connection end which is connected with the first electric tool.

10. The combination of electric tools according to claim 1, wherein the control module comprises a vibration control module which directly detects the vibration to automatically start the second electric tool.

11. The combination of electric tools according to claim 10, wherein the second electric tool comprises a switch controlling the startup of the second electric tool; the vibration control module comprises a vibration sensor which detects the vibration and outputs a sensing signal, and a signal amplification circuit which is connected with the vibration sensor and the switch, amplifying and outputting the sensing signal to the switch, and turning on the switch.

12. The combinations of electric tools according to claim 11, wherein the vibration control module also comprises a comparator which is electrically connected between the signal amplification circuit and the switch; the comparator compares the voltage of the sensing signal with a preset reference voltage; and when the voltage of the sensing signal is greater than the reference voltage, the vibration control module controls the switch to be energized.

13. The combinations of electric tools according to claim 1, wherein the first electric tool is selected from one of the following: sander, table saw, miter saw, electric circular saw, jig saw, angle grinder, electric router, electric hammer, electric drill, electric planer, belt sander, table jig saw, or marble stone machine.

14. The combinations of electric tools according to claim 13, wherein the second electric tool is selected from one of the following: vacuum cleaner, water gun, blower, or portable working lamp.

* * * * *